Figure 1:
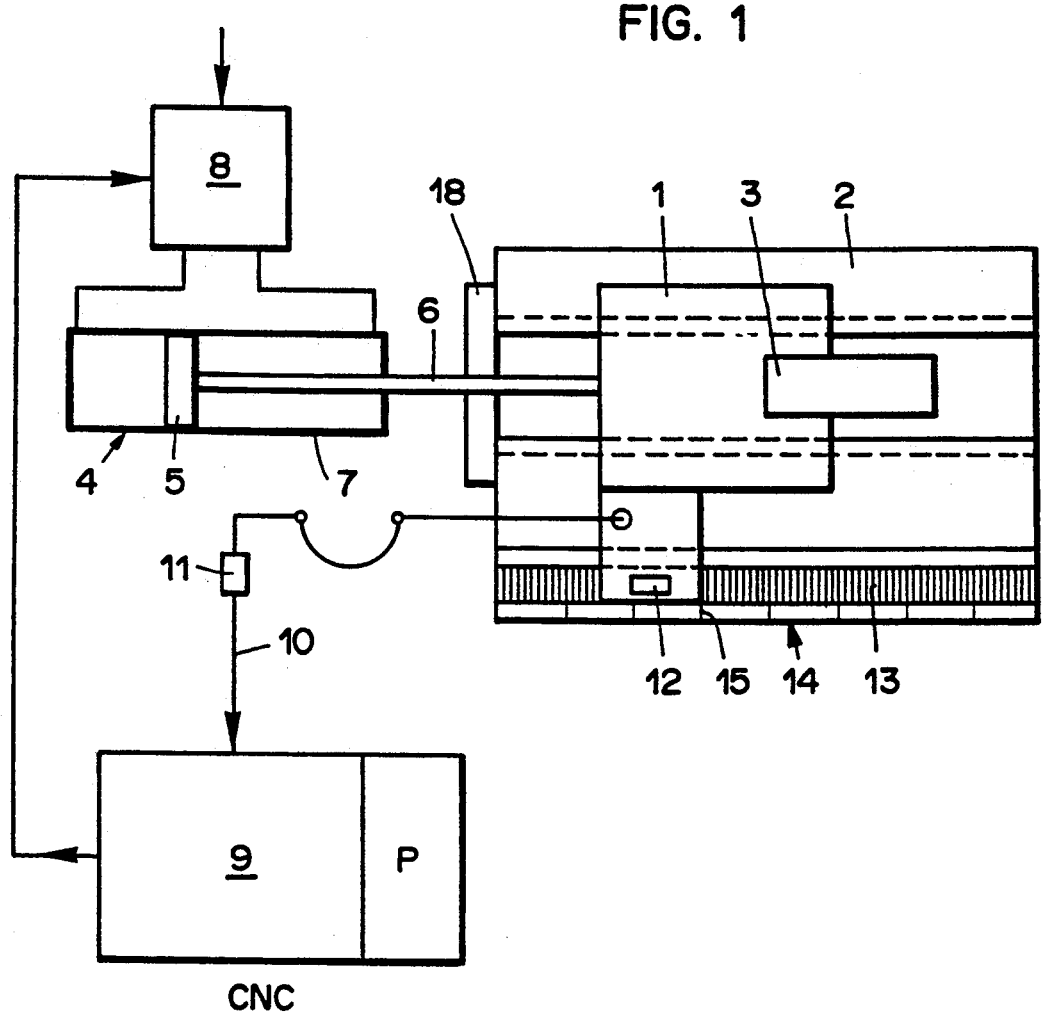

United States Patent [19]

Simonin

[11] Patent Number: 5,283,751
[45] Date of Patent: Feb. 1, 1994

[54] CONTROL DEVICE AND METHOD FOR AN INCREMENTAL NUMERICAL AXIS IN A MACHINING STATION

[75] Inventor: Jean-Claude Simonin, Moutier, Switzerland

[73] Assignee: Tornos-Bechler SA, Fabrique de Machines Moutier, Moutier, Switzerland

[21] Appl. No.: 685,728

[22] Filed: Apr. 16, 1991

[30] Foreign Application Priority Data

Apr. 24, 1990 [CH] Switzerland .......................... 1384/90

[51] Int. Cl.$^5$ ..................... G05B 23/02; B23Q 17/22
[52] U.S. Cl. ........................... 364/474.28; 364/474.2; 318/565
[58] Field of Search ........... 364/474.2, 474.28, 474.35, 364/474.34, 551.02, 559, 474.16; 318/563, 565, 568.1, 569, 572; 395/89; 901/11, 13, 46

[56] References Cited

U.S. PATENT DOCUMENTS

| 3,828,318 | 8/1974 | Bennett et al. | 318/568.1 |
| 4,580,085 | 4/1986 | Eto et al. | 318/565 |
| 4,682,089 | 7/1987 | Tamari | 318/565 |
| 4,757,458 | 7/1988 | Takemoto et al. | 364/513 |

Primary Examiner—Jerry Smith
Assistant Examiner—Steven R. Garland
Attorney, Agent, or Firm—Oliff & Berridge

[57] ABSTRACT

The instantaneous position of a carriage (1) is made explicit in the form of data transmitted via a connection (10) to a circuit (9) by a signal converter (11) and a sensor (12) reading marks (13) on a rule (14). One of the marks (15) acts as a preselected reference mark. During a referencing sequence, the carriage is moved in one direction until it reaches a stop (18). The circuit then causes the appearance of a position error which attains a critical value, causing reversal of the direction of movement of the carriage and activation of detection of the preselected reference.

13 Claims, 3 Drawing Sheets

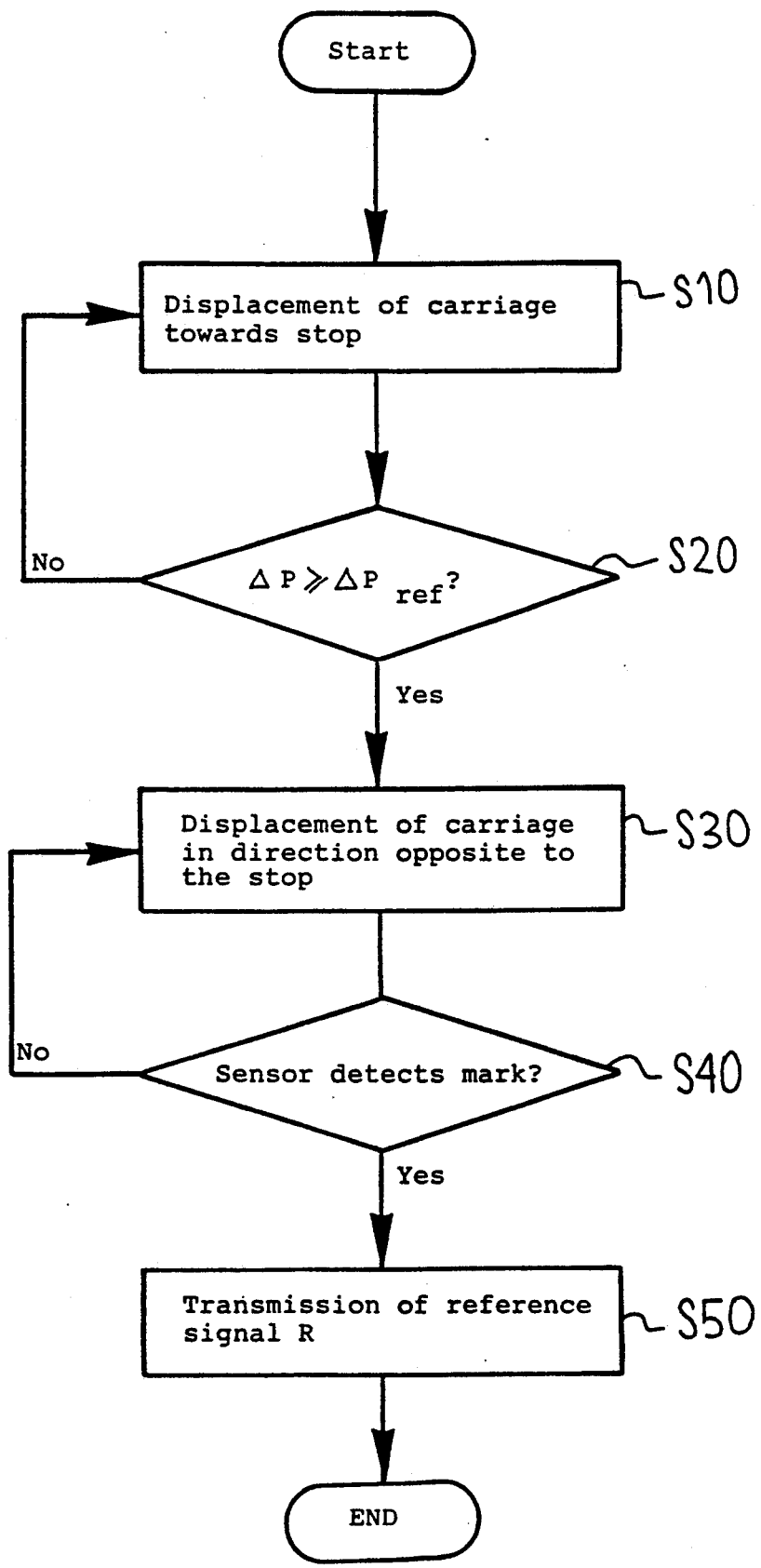

CONTROL DEVICE AND METHOD FOR AN INCREMENTAL NUMERICAL AXIS IN A MACHINING STATION

This invention relates to numerical control equipment, and more particularly to a device for controlling an incremental numerical axis in a machining station, of the type having an assembly associated with the moving axis and capable of traveling along a predetermined path, at least one reference disposed along this path in a predetermined position, moving-assembly drive means capable of moving the assembly in one direction and the other along the path, and detecting means for detecting the reference during a locating movement effected by the assembly.

Numerical control devices of machining stations generally include in their programs a referencing sequence which takes place when the machine is started up. This sequence consists, for each axis, in bringing the carriage subjected to the impulse of that axis into a reference position from which the movements to be carried out during the operating sequence will be counted.

In general, the reference position is determined on a fixed measuring instrument. The position of the moving assembly is constantly detected, both during the referencing sequence and during the operating sequences, relative to that component. The measuring instruments generally take the form of fixed rules bearing detection marks. They are secured along the path of the moving assemblies and comprise a number of reference marks disposed at intervals in order to permit adaptation to the particular conditions of each machine. It is therefore necessary to "activate" whichever of the reference marks it is desired to use at the time of starting operation.

Until now, a sensor has been used for this purpose, usually a contact switch placed near the mark to be activated. During the referencing sequence of the machine's program, the moving assembly is moved until the switch is actuated. At that moment, the reference detector is activated, and when it detects the next reference, the moving assembly is directed toward that reference, and the zero position is stored in the control device.

The measuring instruments are generally high-precision racks meshing with a pinion which drives a rotary encoder, or optical devices mounted on the moving assembly and capable of reading marks borne by the rule.

In order for referencing to take place, therefore, whenever a machine is put into operation it is necessary to place a switch on each axis, in a carefully predetermined position, and to connect that switch to the control unit, so that when there are a large number of axes, this represents a considerable amount of delicate work. U.S. Pat. No. 4,757,458 describes a device applied to a rotary axis. A deviation, variable with the number of turns, between the angular position indicated by a switch and an angular reference gives the number of turns made. The presence of a switch is necessary. The connections to be established clearly represent a risk for the reliability of the prior art systems.

These drawbacks need to be remedied in a simple manner requiring no additional investment in the manufacture of the machines.

It is therefore an object of this invention to provide an improved control device through which the above-mentioned reliability can be enhanced and costs lowered by substituting simpler means for the switch.

To this end, in the control device according to the present invention, of the type initially mentioned, the activation means include action means localized on the aforesaid path and capable of causing the transmission of a signal of the deviation in position of the assembly between an instantaneous position value given by the drive means and a value of the real position of the assembly, and means for processing such signal, capable of initializing the locating movement when the signal corresponds to a predetermined critical deviation of position.

Figure 2:
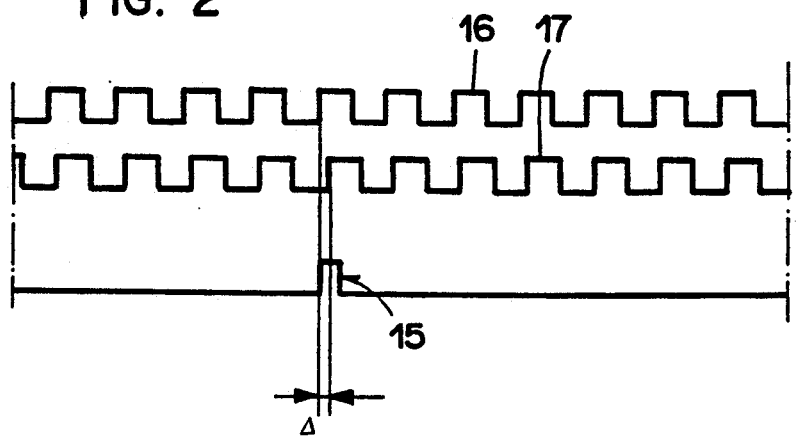
Figure 3:
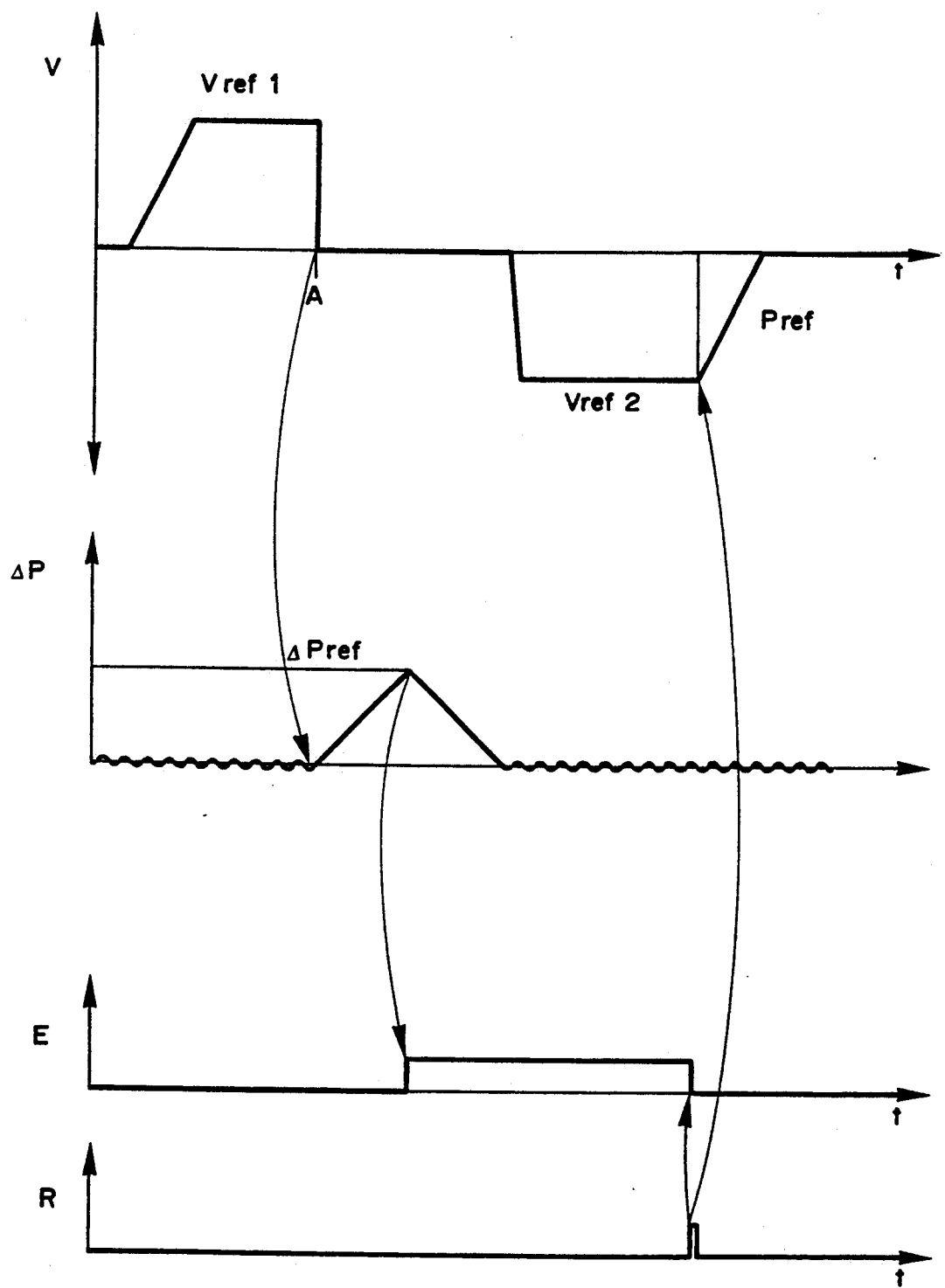

A preferred embodiment of the invention will now be described in detail with reference to the accompanying drawings, in which:

FIG. 1 is a diagrammatic top plan view of a moving assembly and of its control means in a machining station, FIG. 2 is a graph illustrating the position signals transmitted by the detector of the moving assembly, FIG. 3 is a graph depicting processing of the signals of FIG. 2 in the device of FIG. 1 and determination of the reference position, and FIG. 4 is a flowchart of a process for controlling an incremental numerical axis in accordance with the present invention.

A carriage 1, for example, moves on a slideway 2 in a machining station of any kind. Mounted on carriage 1 is a tool holder 3 which need not be more specifically defined. Carriage 1 is actuated by a jack 4, the piston 5 of which is connected to carriage 1 by a rod 6, and the cylinder 7 of which is fed with pressurized oil from a valve system 8 which also need not be described in detail. Valves 8 are controlled by a control unit 9. A part P of unit 9 symbolizes a stored program, and it is seen that unit 9 is connected to a signal converter 11 by a connection 10.

Signal converter 11 is connected in a manner known per se to a sensor 12 which moves with carriage 1 above a series of marks 13 inscribed on a rule 14 associated with slideway 2. By means of marks 13, it is possible to determine in unit 9 the instantaneous position of moving assembly 1, as well as its speed and the direction of its movement, as will be seen below. Besides marks 13, rule 14 also bears a series of marks 15 constituting references.

As stated earlier, marks 13 and 15 may be of any known type. They are devised in terms of the types of encoder and sensor used.

When the axis shown in FIG. 1 is set in motion, carriage 1 is to be brought into a reference or zero position, determined by one of the marks 15 selected beforehand.

FIG. 2 shows the mark 15 selected, or more properly, the signal transmitted by sensor 12 when carriage 1 is opposite that mark. Signals 16 and 17, consisting of trains of square pulses of the same frequency and width, represent the signals transmitted by encoder 12 upon movement of carriage 1 along rule 14. By means of the phase-shift of 90° between the corresponding signals of the series of signals 16 and the series of signals 17, the direction of movement can be determined, while the relative position and the speed can be determined by calculation of the number of signals transmitted per unit of time.

The device described completely avoids the use of an additional signal transmitted to unit 9 for locating whichever one of the marks 15 has been selected as the zero position. The means provided for that purpose follow from the graph of FIG. 3. This graph depicts four parameters which vary as a function of time. On the top line is the parameter V, representing the speed of the moving assembly as a function of time. On the second line is the parameter P, representing the deviation between the instantaneous position of the moving assembly, indicated by the signals of encoder 11, and the position which this moving assembly ought to occupy theoretically at that moment in terms of the program contained in unit 9. As will be seen below, this deviation of position assumes an abnormal value at a certain moment.

The third line depicts, as a function of time and synchronously with the first two lines, a referencing-activation signal E, i.e., of activation of the respective function in detector 12.

As for the fourth line, it depicts the transmission of the reference signal R when carriage 1 passes over the mark 15 which has been preselected.

In order to understand the operation of the system thus programmed, reference is made to FIG. 4 in which it shall be postulated that upon starting up, the device is in an initial position corresponding to that of FIG. 1, for example. At the time operation begins, jack 4 is actuated so that piston 5 moves from right to left, as viewed in the drawing (S10). As may be seen on the first line of FIG. 3, the speed of carriage 1 increases up to a first limit Vref 1, and the movement of carriage 1 continues thus until its slide comes in contact with a stop 18 which limits its travel. At that moment, designated by letter A on the first line of FIG. 3, the movement is halted, and the deviation of position P, which until then has had a very low value corresponding to the determination of the speed of movement in terms of the program, takes on an increasing value, the deviation between the theoretical position and the real position augmenting proportionately to the time. When the deviation attains the value Pref (S20), program P controls the reversal of the direction of movement of piston 5 in jack 4 (S30), on the one hand, and the activation of the referencing function (S40), on the other hand, as indicated above. The velocity of carriage 1 is therefore as depicted by the curve on the first line of FIG. 3, and after a certain lag, increases rapidly to reach a limit Vref 2. Carriage 1 therefore moves from left to right, as viewed in the drawing, at the speed Vref 2 until, detector 12 being activated, it records the signal of passage (S50) over whichever of the marks 15 has been preselected. It may easily be determined, in fact, that as carriage 1 starts from stop 18, the first reference signal 15, or the second, or the third, etc., will be recorded as the zero reference, so that only this reference signal will be operational.

If need be, the position of rule 14 might be adjusted relative to that of stop 18 in such a way that the position of carriage 1 corresponding to halt A (FIG. 3) directly constitutes the reference position. For that purpose, the halt position determined by stop 18 must be sufficiently precise.

It is not necessary, of course, for stop 18 to be a part situated at the end of slideway 2. Any element capable of causing a deviation of position attaining a predetermined critical value during the movement of carriage 1 can be used for carrying out the referencing. What is important is that it is no longer necessary to connect a detection element electrically to the electronic circuit of the control unit, as has been the case until now.

Furthermore, it should be noted that in case the axis is motor-controlled, there might be instances where causing the deviation of position by means of a stop such as stop 18 might not be acceptable. In such a case, however, there might equally well be placed at the proper location on the path of carriage 1, in lieu of a stop, an element which does not block the movement but rather causes braking, hence a slowdown such that a deviation of position attaining the critical value Pref may be brought about.

What is claimed is:

1. A device for controlling an incremental numerical axis in a machining station, comprising:
    a movable carriage capable of moving along a predetermined path;
    drive means for moving said carriage incrementally in either direction along said path;
    at least one preselected reference mark disposed in a preselected position along said path;
    deviation means, disposed along said path of said carriage, for causing an instantaneous position of said carriage to deviate from a programmed position to which said drive means attempts to move said carriage;
    a position detector mounted to said carriage for detecting said at least one preselected reference mark; and
    a control unit for controlling movement of said carriage and including:
        first means for causing said drive means to move said carriage toward said deviation means until said carriage reaches said deviation means;
        determining means for determining when a deviation between the instantaneous position of said carriage and the programmed position to which said drive means attempts to move said carriage reaches a preset limit value due to interaction between said carriage and said deviation means; and
        second means for causing said drive means to move said carriage away from said deviation means until said position detector outputs a reference signal when said position detector detects said at least one preselected reference mark.

2. The device of claim 1, wherein said at least one preselected reference mark is a first mark over which said carriage passes when said second means causes said drive means to move said carriage away from said deviation means.

3. The device of claim 2, wherein said deviation means causes said carriage to stop moving when said carriage contacts said deviation means.

4. The device of claim 3, wherein said deviation means is located at the position of said at least one reference mark.

5. The device of claim 2, wherein said deviation means causes said carriage to slow down when said carriage contacts said deviation means.

6. The device of claim 1, wherein said drive means includes hydraulic means for driving said carriage with fluid pressure, and further comprising a cutting tool located on said carriage.

7. The device of claim 1, wherein said drive means includes an electric motor, and further comprising a cutting tool located on said carriage.

8. The device of claim 1, further comprising a signal converter, coupled between said position detector and said control unit, capable of transmitting to said control unit a series of signals output by said position detector when said carriage passes over a series of marks disposed along said path, and said reference signal when said position detector passes over said at least one preselected reference mark.

9. A process for controlling an incremental numerical axis in a machining station, of the type having an assembly associated with said axis for movement along a predetermined path, at least one preselected reference mark disposed in a predetermined position along said path, drive means capable of incrementally moving said assembly in either direction along said path, deviation means located along said path for causing an instantaneous position of the assembly to deviate from a programmed position, a control unit for controlling the drive means, and a position sensor connected to a signal converter for detecting a position of the assembly along said path, comprising the following steps:

moving said assembly along said path towards said deviation means with said drive means;

when said assembly interacts with said deviation means, determining a deviation in position between a programmed position of said assembly and the instantaneous position of the assembly given by signals output by said signal converter, and comparing the determined deviation to a predetermined limit value with said control unit;

when said determined deviation equals said predetermined limit value, causing said drive means to reverse the moving direction of said assembly with said control unit; and when said position sensor passes over said at least one preselected reference mark, transmitting a reference signal with said signal converter to said control unit.

10. The method of claim 9, wherein said at least one preselected reference mark is a first mark over which said position sensor passes.

11. The method of claim 9, wherein said deviation means causes said assembly to stop moving when said assembly contacts said deviation means.

12. The method of claim 11, wherein said deviation means is located at the position of said at least one reference mark.

13. The method of claim 9, wherein said deviation means causes said assembly to slow down when said assembly interacts with said deviation means.

* * * * *